United States Patent Office 3,455,988
Patented July 15, 1969

3,455,988
UNSATURATED ALICYCLIC GLYCOL MONOESTERS
Roy B. Duke, Jr., Smyrna, Ga., and Milton A. Perry, Longview, Tex., assignors to Eastman Kodak Company, Rochester, N.Y., a corporation of New Jersey
No Drawing. Filed Apr. 23, 1965, Ser. No. 450,500
Int. Cl. C07c 69/08, 69/16, 69/28
U.S. Cl. 260—468                                     5 Claims

ABSTRACT OF THE DISCLOSURE

Unsaturated alicyclic glycol monoesters are formed by (1) the condensation of an unsaturated alicyclic aldehyde with formaldehyde in the presence of a catalyst to form an unsaturated aldol product and (2) the non-catalytic condensation of said unsaturated aldol with another aldehyde. The unsaturated alicyclic glycol monoesters are useful in the preparation of epoxy plasticizers.

DISCLOSURE

This invention relates generally to the preparation of esters, and more particularly to the preparation of unsaturated alicyclic glycol monoesters having the following general formula:

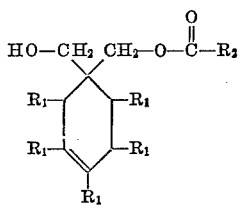

wherein $R_1$ is selected from the group consisting of hydrogen, halogen, alkyl having from 1 to 7 carbon atoms, alkoxy having 1 to 7 carbon atoms, and aryl; including specifically chlorine, bromine, methyl, ethyl, propyl, isopropyl, butyl isobutyl, secondary butyl, tertiary butyl, methoxy, ethoxy, propoxy and phenyl, and $R_2$ is selected from the group consisting of acyclic, alicyclic, unsaturated alicyclic, heterocyclic, heteroaliphatic and aryl; including methyl, ethyl, propyl, isopropyl, butyl, amyl, isoamyl, cyclopentyl, cyclohexyl, cyclohexenyl, alykl substituted cyclopentyl, alkoxy substituted cyclopentyl, alkyl substituted cyclohexyl, alkoxy substituted cyclohexyl, alkyl substituted cyclohexenyl or alkoxy substituted cyclohexenyl, and wherein $R_2$, when acyclic, is preferably lower alkyl having less than 7 carbon atoms; when alicyclic, is preferably cyclohexyl; when unsaturated alicyclic, is preferably cyclohexenyl; when heterocyclic, is preferably a 6-membered heterocyclic ring containing O, N, S, or a combination thereof; and when aryl, is preferably phenyl; and to the novel glycol esters and aldol intermediates therefor.

The formation of esters by the condensation of aldehydes has been described by L. Claisen, Ber. 20, 646 (1887). Later, V. E. Tischenko, J. Russ. Phy. Chem. Soc. 38, 355 (1906), carried out a comprehensive study of the reaction and the condensation appropriately bears his name. The reaction was further investigated by a number of workers, including Villani and Nord, J. Amer. Chem. Soc., 68, (1946), who developed several catalytic systems for effecting the reaction. While catalysts have long been considered necessary to effect the Tischenko reaction, a more recent report, G. K. Finch, J. Org. Chem., 25, 2219 (1960), described what was termed as an anomalous Tischenko reaction whereby the self-condensation of hydroxypivaldehyde could be effected simply by heating the aldol above 80° C. for 8–48 hours without a catalyst.

We have previously discovered an anomalous, non-catalytic, crossed Tischenko reaction between an aldol and an aldehyde which yields a mixed ester, as described in our copending U.S. patent application Ser. No. 323,602. Thus, when an aldol is heated in the presence of an excess of either an aliphatic, alicyclic, heterocyclic, or aromatic aldehyde, the predominant ester obtained is the crossed or mixed condensation product which comprises a glycol ester. This previously discovered reaction is illustrated as follows:

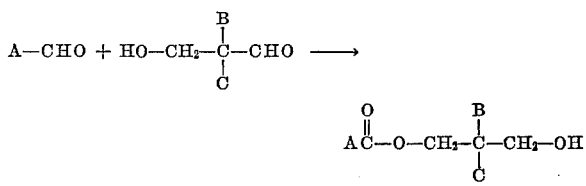

wherein A represents hydrogen, a straight or branched chain alkyl group of from 1 to 17 carbon atoms, e.g., methyl, ethyl, propyl, isopropyl, butyl, secondary butyl, pentyl, hexyl, 2-ethylhexyl, heptyl, decyl, dodecyl, pentadecyl, heptadecyl, and similar hydrocarbon groups, an alicyclic group such as cyclopentyl, or cyclohexyl, an aryl group, e.g., phenyl, tolyl, benzyl, napthyl, etc. groups, or a heterocyclic group such as a furyl group, etc. and B and C each represents the same or different straight or branched chain alkyl group of from 1 to 4 carbon atoms.

It is an object of the present invention to provide new and improved process for producing esters.

It is also an object of the present invention to provide improved unsaturated alicyclic aldols and an improved process for producing said aldols having particular utility in said process for producing said glycol esters.

Other objects of the present invention will be apparent from the detailed description and the claims to follow.

It has been discovered that the objects of the present invention can be achieved by effecting in sequence two aldehyde reactions consisting of (1) condensation of an unsaturated alicyclic aldehyde with formaldehyde in the presence of a catalyst to form an unsaturated alicyclic aldol product and (2) subjecting the aldol product to a non-catalytic crossed Tischenko reaction of the above described general type to produce novel unsaturated alicyclic glycol monoesters.

The foregoing general reactions are illustrated by the following equations:

(1)

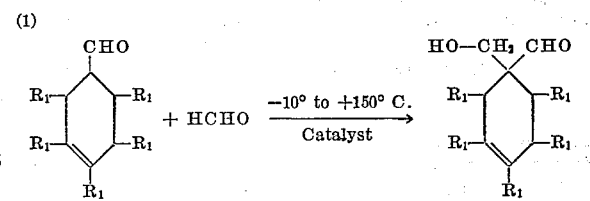

wherein $R_1$ is selected from the group consisting of hydrogen, halogen, alkyl having from 1 to 7 carbons, alkoxy having from 1 to 7 carbons, and aryl; including chlorine, bromine, methyl, ethyl, propyl, isopropyl, butyl, isobutyl, secondary butyl, tertiary butyl and phenyl, and (2)

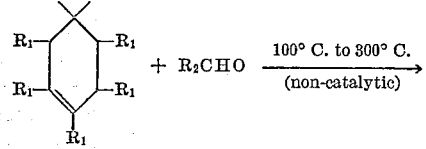

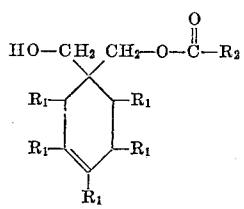

wherein $R_2$ is selected from the group consisting of acyclic, alicyclic, unsaturated alicyclic, heterocyclic, heteroaliphatic, and aryl; including methyl, ethyl, propyl, isopropyl, butyl, amyl, isoamyl, cyclopentyl, cyclohexy, cyclohexenyl, alkyl substituted cyclopentyl, alkoxy substituted cyclopenyl, alkyl substituted cyclohexyl, alkoxy substituted cyclohexyl, or alkyl substituted cyclohexenyl and alkoxy substituted cyclohexenyl, wherein $R_2$, when acyclic, is preferably lower alkyl having less than 6 carbon atoms; when alicyclic, is preferably cyclohexyl; when unsaturated alicyclic, is preferably cyclohexenyl; when heterocyclic, is preferably a 6-membered heterocyclic ring containing O, N, S, or a combination thereof, and when aryl, is preferably phenyl.

The first equation illustrated above describes the preparation of an unsaturated alicyclic aldol precursor for the production of the unsaturated alicyclic glycol monoester product, and is a novel reaction as applied to unsaturated alicyclic aldehydes. It has been found that by employing the unsaturated alicyclic aldehyde and formaldehyde in a ratio from about 1:1 up to about 4:1 while using an alkaline catalyst, such as alkali metal hydroxides or alkali metal carbonates, good yields of the unsaturated alicyclic aldol product are obtained. When the unsaturated alicyclic aldehyde is 3-cyclohexene-1-carboxaldehyde, the ratio of the aldehyde to formaldehyde is preferably about 1.2:1. When the alkaline catalyst used in the first reaction is an alkali metal hydroxide, the temperature at which the reaction is carried out can range between about $-10°$ C. and $+50°$ C., and is preferably maintained between about $0°$ C. and $+15°$ C. If the alkaline catalyst used is an alkali metal carbonate, a temperature range between about $+50°$ C. to $+150°$ C. can be used. The pressure at which this first reaction is performed has no significant effect on the course of the reaction, and atmospheric pressure is therefore preferred.

The second reaction step in the above described process comprises a non-catalytic crossed Tischenko reaction between the unsaturated alicyclic aldol product of the first reaction and an aldehyde which can be selected from a group of aldehydes having diverse structures as shown by the definition of $R_2$. The ratio of aldehyde to aldol in the second reaction should be at least two parts of aldol to one part aldehyde with higher ratios being preferred. The amount of aldehyde used is determined by the yield of intermediate aldol obtained in the first reaction. The temperature at which the second reaction step is carried out can be between about $100°$ C. and $250°$ C., with a preferred temperature range of between about $150°$ C. and $200°$ C.

The following specific examples are for the purpose of further illustrating the present invention and should not be construed at limiting the invention to the particular reactants, proportions and conditions used.

Example 1.—1,1-dihydroxymethyl-3-cyclohexene monoisobutyrate 3-cyclohexene-1-carboxaldehyde, 440 g. (4 moles), and 35% Formalin, 550 g. (6 moles), were combined in a 3000 ml. flask equipped with stirrer, condenser, and thermometer and cooled to 5–10° C. Sodium hydroxide, 10 g. (0.25 mole), dissolved in 100 ml. of water was then added as catalyst and the mixture stirred for 1 hour at 15–30° C. to complete the condensation. Dilute mineral acid was added to neutralize the catalyst followed by addition of isobutyraldehyde, 576 g. (8 moles). The aqueous phase was separated from the mixture and the organic phase washed twice with small quantities of water. The aldol-aldehyde mixture was transferred to an autoclave and heated at 160° C. for 6 hours.

The autoclave product was distilled on an 18-inch Vigreux column to a base temperature of 200° C./760 mm. recovering 357 g. (4.95 moles) of isobutyraldehyde. The mixed esters were then fractionated giving 538 g. (2.74 moles) of 1,1-dihydroxymethyl-3-cyclohexene monoisobutyrate, B.P. 131–134° C./2 mm.; saponification equivalent, 209; hydrogenation equivalent, 214 (Theory 212).

Example 2.—1,1-dihydroxymethyl-3-cyclohexene mono-2-ethylhexanoate 3-cyclohexene-1-carboxaldehyde, 550 g. (5 moles), and 35% Formalin, 432 g. (4 moles), were combined in the apparatus described in Example 1. After cooling to 10° C., sodium hydroxide, 20 g. (0.5 mole), dissolved in 100 ml. of water was added as catalyst. The reactants were stirred for 1 hour at 20–30° C. to complete the reaction. Dilute sulfuric acid was added to neutralize the catalyst, followed by the addition of 2-ethylhexanal, 800 g. (6.25 moles). The aqueous phase was separated and the organic phase washed twice with small quantities of water. The aldolaldehyde mixture was then transferred to a 3-liter flask and heated at 150–160° C. for 8 hours to effect the non-catalytic, crossed Tischenko reaction.

The mixed esters were stripped to a base temperature of 200° C/100 mm. on an 18-inch Vigreux column recovering 870 g. of a mixture of 2-ethylhexanal and 3-cyclohexene -1- carboxaldehyde. The mixed esters were then distilled collecting 522 g.; B.P. 100–170° C./2 mm. The esters were subsequently fractionated on a 15-plate Oldershaw column yielding 1,1-dihydroxymethyl-3-cyclohexene mono-2-ethylhexanoate, 438 g. (1.63 moles); B.P. 145–150° C./1 mm.; saponification equivalent, 265; hydrogenation equivalent, 271 (Theory 268).

Example 3.—1,1-dihydroxymethyl-3-cyclohexene mono-2-methylpentanoate 3-cyclohexene-1-carboxaldehyde, 550 g. (5 moles), and 35% Formalin, 432 g. (4 moles), were combined in the apparatus in Example 1. Potassium carbonate, 50 g., dissolved in 200 ml. of water was added as catalyst. The reactants were then heated to 50–60° C. and stirred for an additional 2 hours at 60–80° C. The crude aldol thus formed was mixed with 2-methylpentanal, 800 g. (8 moles), and the aqueous layer separated. The organic phase was washed twice with small portions of water and then heated to reflux (130–135° C.) for 8 hours, removing the residual water in a Dean-Stark trap.

The mixed esters were striped on an 18-inch Vigreux column to a base temperature of 200° C./120 mm. recovering 655 g. of mixed aldehydes (i.e., 2-methylpentanal and 3-cyclohexene-1-carboxaldehyde). The mixed esters were then distilled yielding 590 g., B.P. 110–150° C/2 mm. The mixed esters were subsequently fractionated on a 15-plate Oldershaw column yielding 1,1-dihydroxymethyl-3-cyclohexene mono-2-methylpentanoate, 392 g., B.P. 135–140° C./mm.; saponification equivalent, 235;

hydroxyl equivalent, 246; hydrogenation equivalent, 242 (Theory 240).

Example 4.—1,1-dihydroxymethyl-3-cyclohexene, mono-3-cyclohexene-1-carboxylate 3-cyclohexene-1-carboxaldehyde, 880 g. (8 moles), and 35% Formalin, 432 g. (4 moles), were combined in the apparatus described in Example 1. After cooling to 10° C., sodium hydroxide, 10 g. (0.25 mole), dissolved in 100 ml. of water was added as catalyst. The reactants were stirred for 1 hour at 20–30° C. to complete the reaction. The catalyst was then neutralized and the aqueous layer separated. The aldol was then washed several times with small quantities of water and then heated to 150–160° C. for 8 hours to effect the non-catalytic, crossed Tischenko reaction. The mixed esters were then stripped on an 18-inch Vigreux column to a base temperature of 200° C./100 mm. collecting 520 g. (4.72 moles) of 3-cyclohexene-1-carboxaldehyde. The mixed esters were then flash distilled on the same Vigreux column collecting 467 g. of product; B.P. 100–200° C./1 mm. This product was then redistilled on a 15-plate Oldershaw column collecting 367 g. (1.47 moles) of 1,1-dihydroxymethyl-3-cyclohexene mono-3-cyclohexene-1-carboxylate; B.P. 173–175° C./1–1.5 mm.; saponification equivalent, 245; hydrogenation equivalent, 125.

In accordance with the foregoing examples, the following esters can also be produced: 1,1-dihydroxymethyl-3-cyclohexene monoacetate, 1,1-dihydroxymethyl-3-cyclohexene monopropionate, 1,1-dihydroxymethyl-3-cyclohexene mono-n-butyrate, 1,1-dihydroxymethyl-3-cyclohexene monoisovalerate, 1,1-dehydroxymethyl-3-cyclohexene mono-2-methylpentanoate, 1,1-dihydroxymethyl-3-cyclohexene mono-2-ethylbutyrate, 1,1-dihydroxymethyl-3-cyclohexene monoisooctanate, 1,1-dihydroxymethyl-3-cyclohexene monoisodecanoate, 1,1-dihydroxymethyl-3-cyclohexene mono-6-methyl-3-cyclohexene-1-carboxylate, 1,1 - dihydroxymethyl - 6-methyl-3-cyclohexene mono-6-methyl-3-cyclohexene-1-carboxylate, 1,1 - dihydroxymethyl-2-ethoxy-3-cyclohexene mono-2-ethoxy-3-cyclohexene-1-carboxylate, 1,1 - dihydroxymethyl-3(4)-chloro-3-cyclohexene-mono - 3(4)-chloro-3-cyclohexene-1-carboxylate, and 1,1 - dihydroxymethyl - 3(4) - methyl-3-cyclohexene mono-3(4)-methyl-3-cyclohexene-1-carboxylate. It will be evident to those skilled in the art that in preparing the foregoing 6-methyl-, the 2-ethoxy-, the 3(or 4)-chloro- and the 3(4)-methyl-substituted cyclohexene compounds, there will be employed in place of 3-cyclohexent-1-carboxaldehyde the following aldehydes: 6-methyl-3-cyclohexene-1-carboxaldehyde, 2 - ethoxy-3-cyclohexene-1-carboxaldehyde, 3(4) - chloro-3-cyclohexene-1-carboxaldehyde,, and 3(4)-methyl-3-cyclohexene-1-carboxaldehyde, respectively.

The glycol monoesters described herein are useful in the preparation of epoxy plasticizers. For example, two molecules of an unsaturated glycol monoester can be linked by a dibasic acid followed by epoxidation of the double bond to yield said epoxy plasticizers. The double bond can also be halogenated to yield plasticizers and functional fluids with flame retardant properties. The double bond of said glycol monoesters may be hydroformylated to yield the corresponding aldehyde; the aldehyde may be subsequently oxidized or reduced to yield tht corresponding carboxylic acid or alcohol. The glycol monoester compounds are also useful sources of the corresponding unsaturated alicyclic diols and monocarboxylic acids in accordance with applicants' copending application Ser. No. 323,602. Polyesters prepared from the unsaturated diols are useful as thermoset resins when copolymerized with a vinyl type monomer.

Although the invention has been described in considerable detail with particular reference to certain preferred embodiments thereof, variations and modifications can be effected within the spirit and scope of the invention as described hereinbefore and as defined in the appended claims.

We claim:
1. An unsaturated alicyclic glycol monoester having the following general formula:

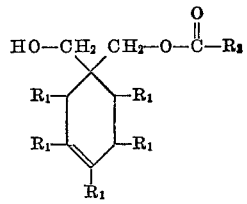

wherein $R_1$ is selected from the group consisting of hydrogen, chlorine, bromine, alkyl having from 1–7 atoms, alkoxy having from 1 to 7 carbon atoms and phenyl, and $R_2$ is selected from the group consisting of alkyl having from 1 to 7 carbon atoms, cyclohexyl, cyclohexenyl, methylcylohexenyl, ethoxy cyclohexenyl, chlorocyclohexnyl and phenyl.

2. 1,1 - dihydroxymethyl-3-cyclohexene monoisobutyrate.

3. 1,1 - dihydroxymethyl-3-cyclohexene mono-2-ethylhexanoate.

4. 1,1-dihydroxymethyl-3-cyclohexene mono-2-methylpentanoate.

5. 1,1 - dihydroxymethyl-3-cyclohexene mono-3-cyclohexene-1-carboxylate.

References Cited

UNITED STATES PATENTS 3,114,766    12/1963    Knopf et al. _____ 260—468

OTHER REFERENCES

French et al.: J. Am. Chem Soc., vol. 64, pp. 1497–1499 (1942).

Shortridge et al.: J. Am. Chem. Soc., vol 70, pp. 946–949 (1948).

LORRAINE A. WEINBERGER, Primary Examiner

P. J. KILLOS, Assistant Examiner

U.S. Cl. X.R.

260—345.8, 410, 469, 476, 488,494,598